Sept. 11, 1945.　　　P. ORLICH ET AL　　　2,384,766
ECHO-SOUNDING DEVICE WITH ARRESTED INDICATOR
Filed July 19, 1939　　　3 Sheets-Sheet 1
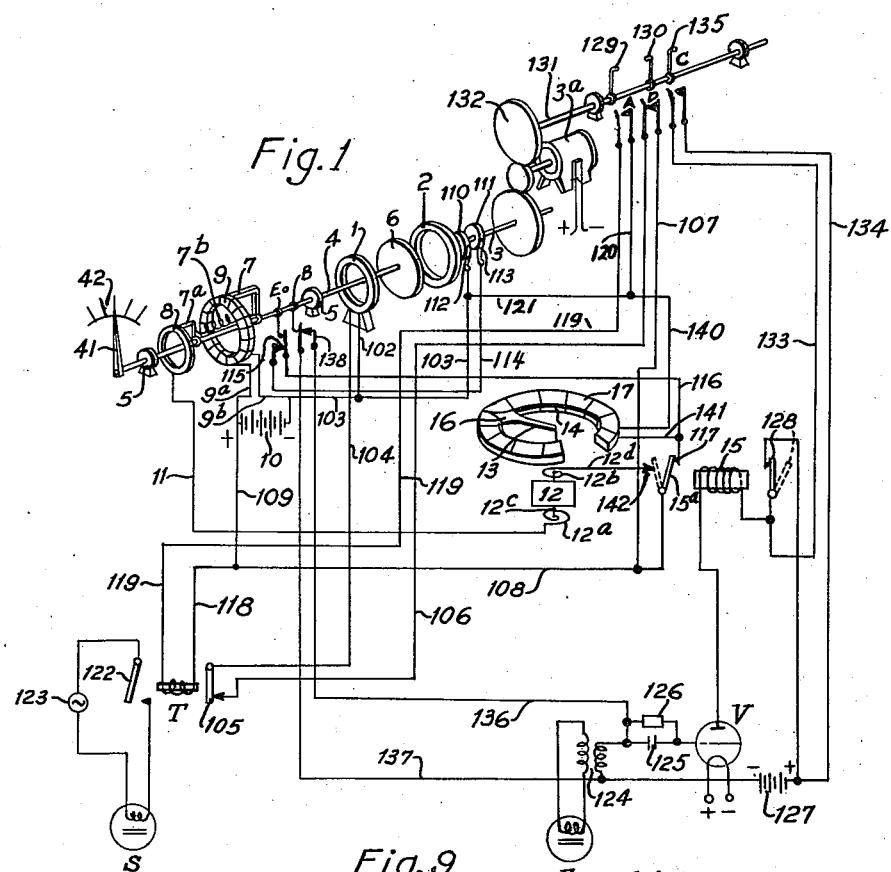
Inventors
PETER ORLICH and HANS HARTZ
By *[signature]*
Attorney.

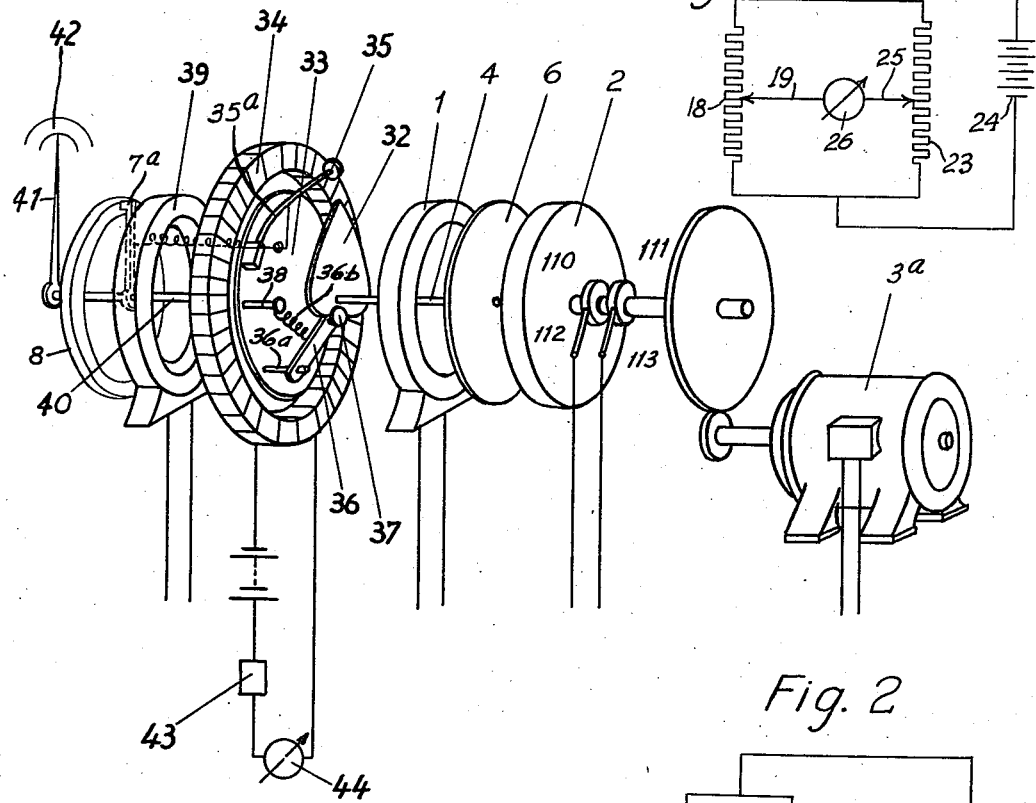
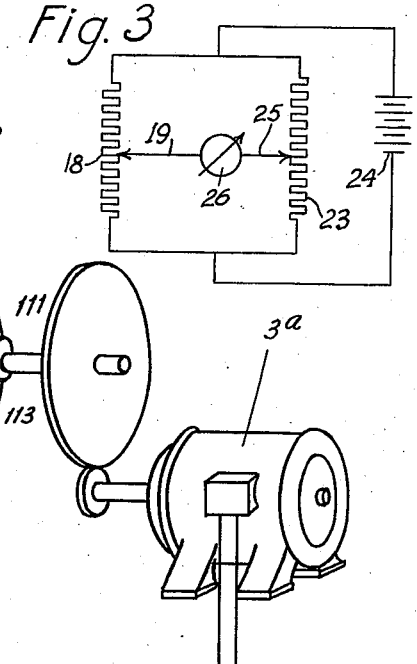
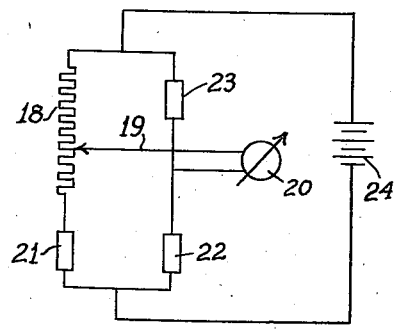
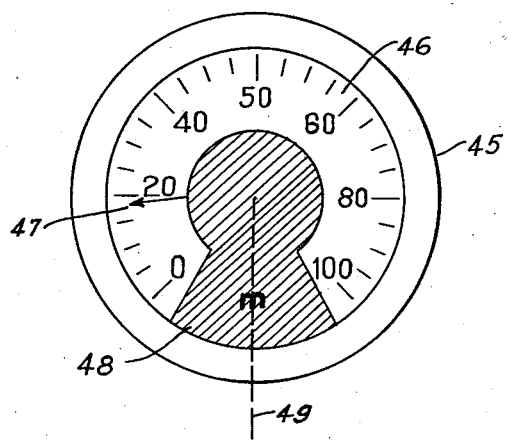

Sept. 11, 1945.   P. ORLICH ET AL   2,384,766
ECHO-SOUNDING DEVICE WITH ARRESTED INDICATOR
Filed July 19, 1939   3 Sheets-Sheet 3

Inventors
PETER ORLICH and HANS HARTZ
By
Attorney.

Patented Sept. 11, 1945

2,384,766

UNITED STATES PATENT OFFICE 2,384,766

ECHO-SOUNDING DEVICE WITH ARRESTED INDICATORS

Peter Orlich and Hans Hartz, Kiel, Germany; vested in the Alien Property Custodian Application July 19, 1939, Serial No. 285,310
In Germany July 26, 1938

3 Claims. (Cl. 177—386)

For echo-sounding devices with stationary indication up to the present, optical indicating means have generally been used which travel over a scale and which flash at the moment of the arriving echo. These indicating means usually consist of a lighted spot produced by a Braun tube or a glow cathode or of an illuminated slot, the opening of which is controlled by mechanical means. The optical indicating means, however, have the disadvantage that they fail, if for some reason the echo does not arrive, so that the reading is thereby rendered difficult.

Furthermore, indicating devices for this purpose are known, which operate with an indicator hand, which permit a stationary reading. In these devices a rotating magnet field is used which is energized for a short time at the moment of the echo arriving and in the direction of which a magnetic hand adjusts itself. These devices, however, have the disadvantage which is inherent to all magnetic indicators, namely that they are subject to stray currents from outside and that errors are thereby introduced into the indication.

According to the present invention the aforementioned disadvantages are removed by using an indicating device which does not operate with a directly stationary indicator but by connecting the indicating device to echo-sounding devices of well-known type which permit only a momentary reading and which operate with a magnetic indicator. Such a device cannot be used directly for a continuous indication, because it is necessary in these devices to return the indicator every time to zero after a sounding has been made. Devices of this character are constructed, for instance, in such manner that between a stationary and a rotary electromagnet an armature disc is disposed and mounted on a shaft which is axially movable and which is provided with an indicator hand. Thereby the disc is attracted by the rotary magnet at the moment when the sound is originally transmitted and attracted by the stationary magnet at the moment of the echo arrival.

According to the present invention a stationary indication is produced with an echo-sounding device of the above-described character by interposing between the rotary mechanical element and the indicator an electrical angle transmission device, and by coupling with the rotary mechanical element an electric contact which actuates the electric angle transmission for a short time at the moment when the echo arrives. In this manner the visible indicator hand is completely separated functionally from the echo-sounding device proper and the indicating device can be suitably damped so that it will not change its position in the time between two successive distant controls.

The invention is illustrated in the accompanying drawings, in which—

Fig. 1 represents semi-diagrammatically one form in which the invention may be reduced to practice.

Figs. 2 and 3 represent wiring diagrams of two modified forms of the circuit, Fig. 1.

Fig. 4 represents semi-diagrammatically a modification of the electromechanical arrangement shown in Fig. 1.

Fig. 8 represents in larger scale the face of the altitude or depth indicating instrument, and Fig. 9 represents a block diagram of a complete measuring arrangement illustrating some additional features of the invention.

Figure 5:
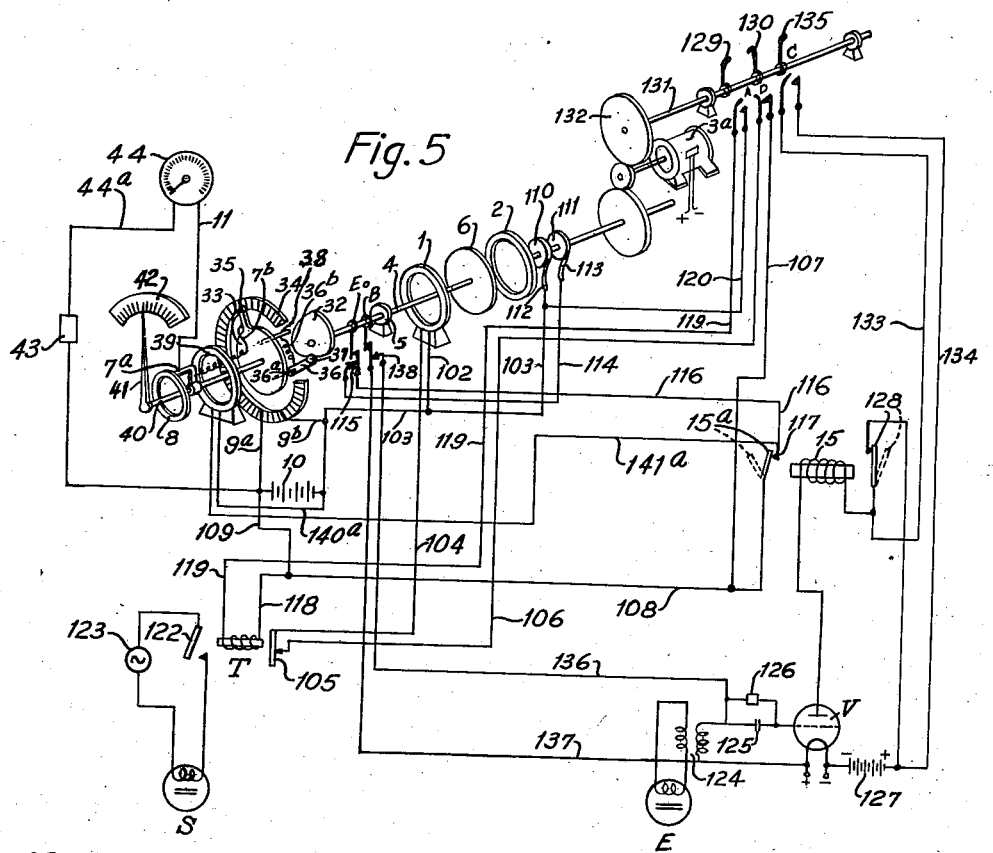
Fig. 5 is a diagram of the mechanism shown in Fig. 4 on a reduced scale showing the complete circuit.

Before referring in detail to the several modifications, it should be stated that the invention is useful not only in measuring depth of water by means of echo sounding, but also altitudes of aircraft or the like, in both cases the ground being used for producing the echo. Therefore, when the term "altitude" is used in the following description, it is meant to imply also depth of water, i. e. altitude of the craft above the bottom of the sea.

By way of illustration, the invention is shown in Fig. 1 applied to an apparatus of the kind disclosed in the patent to Settegast et al., No. 2,032,893. In Fig. 1, a stationary annular electromagnet is shown at 1 and at 2 a similar annular magnet mounted on a shaft 3 so that it can be rotated in a plane in parallel to the plane in which the annular magnet 1 is located. Shaft 3 is continuously rotated by a source of power capable of rotating the shaft continuously at uniform speed, such as for instance an electric motor 3ª. Between the two electromagnets 1 and 2 is disposed an armature disc 6 mounted on a shaft 4 which is longitudinally movable in its bearings 5, 5. The end of shaft 4 has fixed to it a pointer 61 which travels over a scale 62. A battery 10 supplies current for operating the electromagnets. The stationary electromagnet 1 is connected by a wire 102 to a wire 103 leading from the negative end of the battery 10. The other end of the electromagnet 1 is connected by a wire 104 to a normally closed switch 105, thence through a wire 106 to one contact of a normally closed switch D. The other contact of the switch D is connected by a wire 107 to a wire 108 leading to a wire 109 connected to the positive end of the battery 10. The two ends of the rotary electromagnet 2 are connected respectively to two slip rings 110 and 111 mounted on the shaft 3. A brush 112 bearing on the slip ring 110 is connected by the wire 103 to the negative end of the battery 10. A brush 113 bearing on slip ring 111 is connected by a wire 114 to one contact of a switch 115. The other contact of the switch 115 is connected by a wire 116 to a contact 117 of a relay switch 117, 15a normally held closed by a relay solenoid 15. The movable contact 15a is connected to the wire 108, thence to the positive end of the battery. The switch 105 is operated by a relay magnet T. One end of the relay magnet T is connected by a wire 118 and wire 109 to the positive end of the battery 10. The other end of relay magnet T is connected by a wire 119 to one contact of a normally open switch A. The other contact of switch A is connected by wires 120, 121 and 103 to the negative end of the battery 10. The relay magnet T also operates a switch 122 controlling the circuit of a sound-emitter S operated by alternating current from a source 123. A sound receiver E is connected by a transformer 124 to an amplifying circuit including a vacuum tube V, a grid condenser 125 and a grid leak 126. The plate circuit of the vacuum tube V includes a battery 127, the relay electromagnet 15, and a holding switch 128. The switches A and D are operated by cams 129 and 130 on a shaft 131 driven through a gear 132 by the motor 3a.

The parts so far described are all shown in the aforesaid Settegast et al. patent and operate in the following manner:

In the starting condition, the electromagnets 1 and 2 are both excited but the armature disk 6 is attracted to the magnet 1, a condition resulting from the preceding operation as will be described presently.

As the shaft 131 rotates, the cam 129 closes the switch A and energizes the relay T. This has the double effect of operating the sound-emitting device S and opening switch 105. The circuit of the holding magnet 1 is thus broken, the magnet is deenergized, and the armature 6 jumps to the running magnet 2. Thus while the sound is travelling, the pointer 41 is being moved at a uniform rate from its zero position, in which it was left by the preceding operation. When the echo is received by the receiver E, the vacuum tube valve V reduces the current in the circuit of relay 15 sufficiently to release the switches 15a and 128. The switch 117 opens the circuit of running magnet 2, thus releasing the armature 6 which jumps back to the holding magnet 1, the latter having been reenergized meanwhile by the closure of switch 105. The pointer 41 is thereby stopped in its definitive position corresponding to the time of travel of the sound.

After certain intermediate operations to be described presently, the armature 6 is picked up by the running magnet again and carried toward starting position. This requires the reenergization of running magnet 2 followed by the deenergization of holding magnet 1. For the former purpose, a switch C is connected by wires 133 and 134 in parallel to the switch 128. The switch C is operated by a cam 135 after the longest time of echo return for which the apparatus is designed. This restores current to the relay 15 and closes switch 15a, 117, reenergizing running magnet 2, but the armature disk 6 continues to be held by the stationary magnet 1. This is followed by the operation of switch D by cam 130, which opens the circuit of holding magnet 1. The armature 6 jumps to the running magnet and is turned toward the starting position. The armature and pointer 41 are stopped in starting position by a cam $E_0$ operating switch 115. This opens the circuit of running magnet 2 and the armature 6 jumps to the holding magnet 1 which has been reenergized by the closure of switch D. The cam $E_0$ leaves the switch 115 just before the pointer 41 is stopped in starting position and the running magnet 2 is thereby reenergized. The apparatus remains in this condition until the next sound is emitted.

The secondary winding of transformer 124 is short-circuited during a sufficient length of time following the emission of a sound by sound-emitter S to avoid operation of the receiver E by the sound travelling directly from the emitter S. For this purpose, two wires 136 and 137 are connected to a switch 138 closed by a cam B during a short time following the operation of the sound-emitter.

All of the mechanism and operations described so far are disclosed in the aforesaid Settegast et al. patent. In accordance with the present invention, the definitive positions of the pointer 41 resulting from successive soundings are transmitted by angle-transmitting apparatus to an indicating device in a manner now to be described.

The indicating device comprises a deflectable galvanometer coil 12 fixed upon an oscillatable arbor 12c bearing a pointer 13 which moves over a circular magnet 14, the face of which is graduated in a scale 17 corresponding to altitude or depth units. One lead 12a from the galvanometer coil 12 is connected by wire 11 to a stationary contact ring 8. Bearing on the contact ring 8 is a contact arm 7a fixed to and insulated from the shaft 4 and electrically connected by a wire 7b to a yielding contact arm 7, which is also mounted in fixed position on the shaft 4 and insulated therefrom. Opposite the contact arm 7 is an annular resistance coil 9, which is stationary and is fed with current from the battery 10 by wires 9a and 9b. The other lead 12b of the galvanometer coil 12 is connected by a wire 12d to a stationary contact 142 which is engaged by the switch arm 15a when the latter is released by relay magnet 15. The switch arm 15a is connected by wires 108 and 109 to the positive side of the battery 10. The magnet 14 is an electromagnet and is connected to the negative side of the battery by wires 140, 121 and 103, and the positive side of the battery by wire 141, switch 117, 15a, and wires 108 and 109. Thus, the excitation of electromagnet 14 is dependent upon the switch arm 15a being held by the relay 15, a condition which exists except during the time interval between the stopping of the pointer 41 in its definitive position and the reenergization of running magnet 2 in preparation for the return of the pointer 41 to starting position. The pointer 13 is either of magnetic material or is provided with a small armature 16 located close to the magnet 14.

The above-described indicating mechanism operates in the following manner. During the time that the pointer 41 is travelling against the echo, the electromagnet 14 is energized and the pointer 13 is held in its previous setting. When the echo is received, the relay 15 drops the switch arm 15a, breaking the circuit of electromagnet 14 and releasing the pointer 13. At the same time, the switch arm 15a comes into contact with the stationary contact 142 and closes the circuit of the galvanometer coil 12. The current flowing in the coil 12 is determined by the position of the contact arm 7 upon the rheostat 9. When the armature 6 jumps to the holding magnet 1, the shaft 4 moves axially to the left and brings the arm 7 against the rheostat 9 at a point determined by the travel of the pointer 41 up to the time the echo was received. The rheostat circuit will be recognized as a potentiometer connection, which varies the current in the coil 12 according to the point of contact of the arm 7 upon the rheostat 9. After the pointer 13 has assumed its new position corresponding to that of the pointer 41, the relay 15 is reenergized by the operation of switch C, the circuit of electromagnet 14 being closed, and that of the coil 12 being opened. The pointer 13 is held against the scale 17 until released by the return of the next echo.

The sounding time-measuring device, as well as the indication transmitting arrangement, may be replaced according to the invention also by other means. For instance, the circuit arrangement for transmitting the angular position of the contact arm 7 after the arrival of the echo may be arranged in the manner shown in Fig. 2. In this figure, 18 represents the annular resistance such as 9 in Fig. 1, and 19 represents the equivalent of contact arm 7 of Fig. 1. 20 is a remote receiver having a galvanometer coil, such as 12 in Fig. 1, 21, 22 and 23 are fixed resistances, approximately of the order of the annular resistance 18, and 24 represents a source of current. If the transmitting system, shown in Fig. 2, is applied to the apparatus of Fig. 1, the resistance 9 is replaced by resistance 18, battery 10 by battery 24, and galvanometer coil 12 by that of the remote indicator 20. Slight changes in the circuit connections of Fig. 1 have to be provided in order to properly connect the bridge resistances 21, 22, and 23. This arrangement constitutes a Wheatstone bridge and has the advantage that the scale of the instrument 20 may be divided linearly.

The arrangement, however, may also be made as shown in Fig. 3, in which the fixed resistances 21 and 22 are omitted and in which resistance 23 is formed as a second annular resistance similar to 18 and is provided with a sliding contact 25. This sliding contact 25 is mechanically connected with the receiving instrument 26 in such manner that it follows up the motion of contact arm 19 until the current in the bridge branch 19, 26, 25 equals zero. Such an arrangement has the advantage that it is insensitive against voltage variations of source 24. Besides, it is possible in such a case to bring about the contact between arm 7 as in Fig. 1, or arm 19 as in Fig. 3, with its appertaining annular resistance, not mechanically by shifting the shaft as described with reference to Fig. 1, but magnetically by an annular magnet which attracts the contact arm 7, in this case made of magnetic material, thereby bringing about its contact with the annular resistance 9.

Furthermore, in place of the remote angle transmission means shown and described with reference to Figs. 1 to 3, any other suitable angle transmission device may be used. Finally, in place of the arresting magnet 14 in Fig. 1, any other arresting device may be used which holds the indicator hand in its position during the time when no remote indication occurs.

It may be desirable at times to modify the arrangement according to the invention, and as described so far, in such manner that the electric contact at the annular resistance, such as 9 in Fig. 1, remains permanently at the point at which it has been brought by the arrival of a first echo until a second echo has arrived, at which time it is moved to a new point according to the running time of the second echo. Thereby the differences in running time between the two echoes can be ascertained. The manner in which such an arrangement may be reduced to practice is shown in Figs. 4 and 5. A large part of an apparatus shown in these figures is the same as that shown in Fig. 1, and the same reference numerals are applied to similar parts. One of the differences is that the pointer 41 is not mounted on the same shaft with the armature 6. The shaft 4 has fixed on its left end a heart cam 32 which stands opposite an armature disk 33 mounted on a shaft 40 which has the pointer 41 fixed to it. The shafts 4 and 40 are coaxial. The disk 33 is surrounded by an annular resistance coil 34 upon which bears a contact roller 35 supported by an arm 35a upon the disk 33. An arm 36 is pivoted upon a pin 36a fixed to the disk 33 and carries at its end a roller 37 bearing upon the heart cam 32. A spring 36b stretched between the arm 36 and a pin 38 projecting rigidly from the disk 33 holds the arm 36 against the heart cam. It is well known that in a mechanism of this kind the roller 37 seeks the part of the heart cam 32 nearest the axis of rotation and in this way the angular position of the disk 33 can be made to follow changes in the angular position of the heart cam 32. A stationary electromagnet 39 is positioned coaxially with and close to the disk 33. When the electromagnet 39 is excited, the armature disk is locked against it and cannot follow movements of the heart cam until the electromagnet is deenergized. The electromagnet 39 is functionally similar to the electromagnet 14 of the apparatus shown in Fig. 1, and is connected in the circuit in the same way by wires 140a and 141a.

The electrical connection between the contact roller 35 and the remote indicating device is similar to Fig. 1. A wire 7b connects the arm 35a to a contact arm 7a fixed to and insulated from the shaft 40. The arm 7a bears against a stationary annular contact ring 8 which is connected by a wire 11 to an electrical measuring instrument 44. The other terminal of the electrical measuring instrument is connected by a wire 44a through a resistance 43 to the positive side of the battery 10. The two terminals of the battery 10 are connected by wires 9a and 9b to the two ends of resistance coil 34. The potentiometer circuit thus formed serves to adjust the instrument 44 to the same angular position as the pointer 41.

This apparatus operates in the following manner: The armature disk 33 is normally locked by the electromagnet 39. When the armature 6 is set in rotation by attraction to the running magnet 2, the heart cam 32 revolves with it, but the pivot 36a of the arm 36 remains stationary and the roller 37 rides along the heart cam 32. The release of switch arm 15a by relay 15 upon receipt of the echo simultaneously breaks the circuit of running magnet 2 and of holding magnet 39. The armature 6 jumps to the holding magnet 1 and the heart cam 32 is held in the position it had reached at the instant the echo was received. The release of armature disk 33 by holding magnet 39 allows the roller 37 to run into the low part of heart cam 32, thus setting the armature disk 33 and pointer 41 to the same angular position as the heart cam 32. The movement of the pointer 41 is followed by the pointer of the instrument 44. When the relay 15 is excited by closure of switch C, the holding magnet 39 is immediately excited and fixes the position of the pointers 41 and 44. In other respects this apparatus is the same as the one first described.

Figure 7:
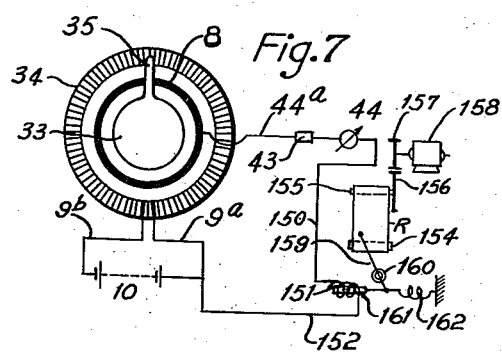
Fig. 7 is a diagram on a reduced scale of a part of the apparatus shown in Fig. 4 with the addition of a recording mechanism.
Figure 6:
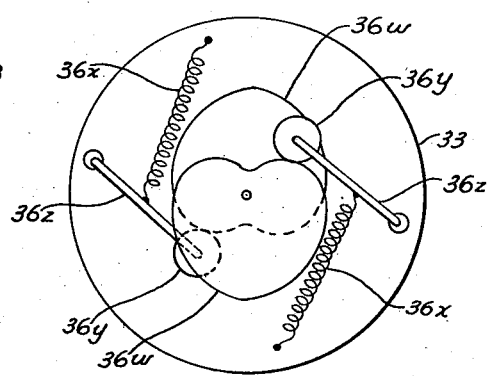
Fig. 6 is a front elevation of a modified form of the heart cam mechanism shown in Fig. 4.

It is also possible, of course, instead of using a single heart-shaped cam and a single lever such as in Fig. 4, to use several of such cams and levers symmetrically mounted on their respective supports in order to avoid a one-sided pressure against shaft 4. Such a heart cam device is shown in Fig. 6. Upon the armature disk 33 are pivoted two arms 36z bearing rollers 36y at their ends which are drawn by springs 36x against two symmetrically arranged heart cams 36w. Furthermore, it may also be desirable some time, instead of using an electric indicating instrument 44, to use a recording instrument which may also be used together with the indicating instrument. Such an apparatus is shown in Fig. 7. An armature disk 33 with contact member 35 bears on annular resistance coil 34 which is supplied with current from a battery 10 through wires 9a and 9b. A contact ring 8 is connected by wire 44a through resistance 43 with an electrical indicating instrument 44. The other terminal of instrument 44 is connected by a wire 150 to one end of an electromagnet 151, the other end of which is connected by a wire 152 to the positive end of the battery 10. A record sheet R is mounted upon rollers 154 and 155, the latter being driven through gears 156 and 157 by a motor 158. A stylus 159 bears upon the record sheet R and is pivotally mounted at 160. The opposite end of the stylus is connected to an armature 161 operated by the electromagnet 151 against the action of a spring 162.

When practicing the invention the following should be taken into consideration. The indicating instrument is in general arranged so that the transmission of the original sound occurs when the indicating element travels through the zero point of the scale, which would mean zero depth or height as the case may be. However, the zero point of the scale, which is disposed either ahead of or behind the indicator, does not always coincide with the zero point of the indicator or of the indicating instrument itself. This occurs when the transmitter and/or receiver is not located at the lowest point of the craft, the distance of which above ground is to be measured. This is the case in particular in echo-sounding devices which are arranged on aircraft. In this case, the transmitter as well as the receiver are frequently mounted in the wings of the craft, and are thereby removed a considerable distance from the lowest point of the craft, for instance from either the landing wheels or the pontoons. In order to avoid confusion in the operator's mind between the zero point of the indicating instrument and the zero point of the scale, the indicator is made ineffective for indicating purposes within the sector of the indicating instrument between the zero point of the instrument and the zero point of the scale. This may be attained, for instance, by covering the sector in question by means of a screen which is disposed in front of the indicator and preferably made a part of the casing of the instrument.

In Fig. 8 such an arrangement is shown. In this figure, 45 represents the indicating instrument of the sounding device provided with a scale 46 over which an indicator hand 47 travels. In the central part of the instrument a screen 48 is arranged which covers the scale 46 and hand 47 through a given angle. This sector covers an area which is located between the dash line 49 and the zero point of the scale. The indicating instrument is built so that when hand 47 or a traveling adjusting device for hand 47 passes through the point represented by dash line 49, the sound emission occurs so that thus line 49 represents the zero point of the indicating mechanism itself.

It is further desirable to operate the entire echo-sounding system according to the invention by means of a controlled motor which is constructed as a single armature converter, preferably as a direct current to direct current converter. It is well known that in echo-sounding arrangements of this type, besides the receiver, frequently an amplifier is also required. This amplifier requires a constant operating voltage which in most cases is different from the available line or battery voltage. If now the driving motor of the sounding system is constructed as a converter of the type aforementioned, the different operating voltages can be derived from the generator portion of the converter. Thus, special anode batteries or current transformers may be eliminated.

Such a converter may, of course, be used at the same time for any auxiliary devices which are connected with the indicating device and which likewise require constant operating voltages.

In Fig. 9, an echo-sounding arrangement in connection with a converter current supply is shown in the form of a block diagram. In this figure, 50 represents the sound transmitter which is connected with the fixed electromagnet 51 of an echo-sounding device 52, for instance of the type shown in Fig. 4 and which is controlled by means of a signal controller 53. The echo-sounding device 52 is operated by way of a gear train 54 from a motor 55 which is constructed as a direct current to direct current single armature converter. The motor is maintained at constant speed by means of the speed regulator 56 which may be of any conventional construction known in the art. From this motor, which is supplied with current from the line 64, a generator line 57 extends to the amplifier 58 which requires constant anode voltage. The necessary cathode heating current is supplied to the amplifier from the main line by way of supply line 59. The amplifier is connected by way of line 60 with the sound receiver 61. The latter is connected by way of the amplifier and line 62 with the rotary electromagnet 63 of the echo-sounding device.

A particular advantage of the arrangement according to Fig. 9 resides in the fact that in this manner considerable space is saved which is particularly important in aircraft or in sounding devices mounted in submarines.

We claim:

1. The combination with an echo-sounding device having a rotatable measuring element, means for simultaneously emitting a sound and setting said measuring element in rotation at a definite speed, echo-controlled means for stopping the rotation of said measuring element, and means operative after an interval following the stopping of said measuring element for resetting the latter to a starting position; of remote indicating means including follower means controlled by said measuring element and tending to follow the movements thereof, means extending in axial alignment with respect to said follower means, said means adapted to hold, said follower means at least approximately stationary while said measuring element is moving, and means for releasing said follower means from said holding means in the interval between the stopping and resetting of said measuring element, to allow said follower means to assume a position corresponding to that in which said measuring element has been stopped, a remote indicator and means whereby said indicator repeats the positions of said follower means.

2. In an echo-sounding device, a rotatable measuring element, means for simultaneously emitting a sound and setting said measuring element in rotation at a definite speed, an annular resistance member, a contact member adapted to coact therewith, an armature mounted to rotate on an axis coaxial with said measuring element, one of said members being mounted on said armature and the other being stationary, means coupling said armature and said measuring element so that the former tends to seek a definite relative position with respect to the latter, means for holding said armature at least approximately stationary while said measuring element is rotating, echo-responsive means for stopping said measuring element and for releasing said armature momentarily to allow the latter to assume said definite position relative to the former, remote indicating means, and an operating circuit therefor including said contact and resistance members and a source of current.

3. In an echo-sounding device, measuring means comprising a constantly rotating driving electromagnet and a rotary measuring element coacting therewith, an annular resistance member, a contact member adapted to coact therewith, an armature element mounted to rotate on an axis coaxial with said measuring element, one of said members being mounted on said armature element, a holding electromagnet to hold said armature element stationary, heart cam coupling means interconnecting said armature element and said measuring element and comprising at least one heart cam on one of said elements and at least one spring influenced cam follower on the other of said elements, means for simultaneously emitting a sound and energizing both of said electromagnets, echo-responsive means for simultaneously de-energizng said electromagnets, and for stopping said measuring element while said armature element, under the influence of said heart cam coupling means, assumes a position corresponding to said measuring element, remote indicating means, and an operating circuit therefor including said contact and resistance members and a source of current.

PETER ORLICH.
HANS HARTZ.